United States Patent
McNamara et al.

(10) Patent No.: US 9,828,558 B2
(45) Date of Patent: Nov. 28, 2017

(54) REFINING OF USED OILS

(71) Applicant: HydroDec Development Corporation Pty Ltd, Epping, New South Wales (AU)

(72) Inventors: Mark McNamara, Cherrybrook (AU); Gordon Chung, Carlingford (AU); Yong Feng Wang, Blacktown (AU); Michael Lucas, Killara (AU); William Hand, Young (AU)

(73) Assignee: Hydrodec Development Corporation Pty Ltd, New South Wales (AU)

( * ) Notice: Subject to any disclaimer, the term of this patent is extended or adjusted under 35 U.S.C. 154(b) by 0 days.

(21) Appl. No.: 14/399,297

(22) PCT Filed: Jul. 2, 2014

(86) PCT No.: PCT/AU2014/000687
§ 371 (c)(1),
(2) Date: Nov. 6, 2014

(87) PCT Pub. No.: WO2015/139068
PCT Pub. Date: Sep. 24, 2015

(65) Prior Publication Data
US 2016/0208178 A1 Jul. 21, 2016

(30) Foreign Application Priority Data
Mar. 17, 2014 (AU) ................ 2014900905

(51) Int. Cl.
| | | |
|---|---|---|
| *C10G 67/04* | (2006.01) | |
| *C10G 67/14* | (2006.01) | |
| *B01D 19/00* | (2006.01) | |
| *C10G 31/08* | (2006.01) | |
| *C10G 45/02* | (2006.01) | |
| *C10G 53/04* | (2006.01) | |
| *C10G 19/00* | (2006.01) | |
| *C10G 19/02* | (2006.01) | |
| *B01D 11/04* | (2006.01) | |

(52) U.S. Cl.
CPC .......... *C10G 67/14* (2013.01); *B01D 11/0492* (2013.01); *B01D 19/0036* (2013.01); *C10G 19/00* (2013.01); *C10G 19/02* (2013.01); *C10G 31/08* (2013.01); *C10G 45/02* (2013.01); *C10G 53/04* (2013.01); *C10G 67/04* (2013.01); *C10G 2300/202* (2013.01)

(58) Field of Classification Search
CPC ........................................ C10G 67/04
See application file for complete search history.

(56) References Cited

U.S. PATENT DOCUMENTS

| | | |
|---|---|---|
| 4,414,194 A | 11/1983 | Blytas |
| 4,623,448 A | 11/1986 | O'Connell et al. |
| 4,816,138 A | 3/1989 | Visser et al. |

FOREIGN PATENT DOCUMENTS

| | | | |
|---|---|---|---|
| AU | WO 9414731 A1 * | 7/1994 | ............... A62D 3/37 |
| WO | WO 94/14731 | 7/1994 | |
| WO | WO 2007/136340 | 11/2007 | |

OTHER PUBLICATIONS

International Search Report (PCT/AU2014/000687)—6 pages.

* cited by examiner

Primary Examiner — Randy Boyer
(74) Attorney, Agent, or Firm — Dority & Manning, P.A.

(57) ABSTRACT

The invention relates to a method for refining a feed oil having contaminants therein. In the method, the feed oil is exposed to reducing conditions at elevated temperature and pressure so as to reduce at least some of said contaminants. The resulting oil is then degassed under reduced pressure under non-oxidizing conditions and the resulting oil extracted with water so as to produce a refined oil.

14 Claims, 4 Drawing Sheets

REFINING OF USED OILS

FIELD

This invention relates to an improved process for refining used electrical insulating oils to produce naphthenic base oils that are also suitable for use as new naphthenic mineral insulating oils.

BACKGROUND

Renewable sources of hydrocarbons are becoming of increasing importance. In particular naphthenic hydrocarbons, which represent only some 5% of known crude oil reserves, are currently in declining supply with the known available supplies becoming more difficult to recover and refine. One primary application of refined naphthenic oils is in the production of electrical insulating oil, commonly referred to as transformer oils. This oil acts as a primary insulator in the transformers and associated equipment that form the critical transport and delivery infrastructure for the worlds electricity supply. The current annual consumption rate for electrical insulating oils is estimated to be 1.35 billion liters and growing. Disposal of used electrical insulating oil is occurring at a rate likely in excess of around 1 billion liters per annum and the stock of oil in service awaiting final disposal is in the range of 20 billion liters. Capturing and re-processing this material reduces the amount of materials that needs to be disposed of and also reduces the need to extract and refine further replacement crude oil.

Used electrical insulating or transformer oils are predominantly disposed of for secondary uses including incineration as a supplementary fuel or combustion directly in energy recovery. Smaller volumes of higher quality segregated used transformer oils are in some cases filtered and dried for re-use as cheaper second quality oils. Such disposal methods are failing to meet the increasing demand for more efficient and high quality recycling and materials recovery. Since 2005 one company, Hydrodec Group, has been refining used and PCB contaminated transformer oils then subsequently further processing the refined product to produce new electrical insulating oil.

The drive for increased efficiency in electrical equipment is demanding the production of more consistent electrical insulating oils resistant to oxidation, having strong electrical properties and good compatibility with other materials of construction. These properties are created mainly through hydroprocessing to deliver higher levels of saturates and more controlled sulphur levels without compromising the viscosity and solvency of the oil. These same properties are also consistent with other applications for naphthenic base oils including for example in agriculture. Technology for re-processing used transformer oils also needs to progress with the changing mix of used transformer oils including ester oils and other contaminants.

Used electrical insulating oils degrade during use through oxidation, and other complex reactions in the presence of metals and other equipment components and also through exposure to electrical arcing and other strong electrical field effects. They may also contain additives from the original new oil including oxidation inhibitors, metal passivators and polychlorinated biphenyls. Catalytic hydroprocessing of the used insulating oils under the appropriate conditions reduces the oxidised oils and removes additives remaining in the oil. It also, in the presence of a basic nitrogen containing compound, dehalogenates the oils while the basic nitrogen containing compound neutralises the acid sites formed during hydroprocessing thereby protecting the catalyst and catalyst support from acid attack and protecting the oil from hydrocracking side reactions.

An earlier process for refining used transformer oils is described in PCT/AU93/00682. This process included a method for removing a halide from a halide containing compound and oxygen from an oxidised organic compound in an organic solvent, permitting recovery of the organic compound and the organic solvent in a halide and oxygen free condition. The practical expression of this process resulted in a system for processing and refining used electrical insulating oil to remove the halogen from PCB and oxygen from aged oil to produce a refined dehalogenated oil product.

The process of PCT/AU93/00682 does not produce a product suitable for use as new insulating oil since the product contained reduced and reactive volatile and semi-volatile sulphur compounds and other oil species. The oil requires further processing to correct these properties before it achieves a quality that meets agreed technical standards defining new naphthenic base oils suited for use in new electrical insulating oil and similar applications. Further processing of the product from this process is required to address quality deficiencies in the product relating to oxidative stability and corrosivity.

There is therefore a need for an improved process in order to at least partially overcome the above deficiencies.

SUMMARY OF INVENTION

In a first aspect of the invention there is provided a method for refining a feed oil having contaminants therein, said method comprising:
  i. exposing said feed oil to reducing conditions at elevated temperature and pressure so as to reduce at least some of said contaminants;
  ii. degassing the resulting oil under reduced pressure before the oil is exposed to any relatively more oxidizing conditions than pertain immediately after step i; and
  iii. extracting the resulting oil with water so as to produce a refined oil.

In another form this aspect provides a method for refining a feed oil having contaminants therein, said method comprising:
  i. exposing said feed oil to reducing conditions at elevated temperature and pressure so as to reduce at least some of said contaminants;
  ii. degassing the resulting oil under reduced pressure before the oil is exposed to any oxidants; and
  iii. extracting the resulting oil with water so as to produce a refined oil.

In another form this aspect provides a method for refining a feed oil having contaminants therein, said method comprising:
  i. exposing said feed oil to reducing conditions at elevated temperature and pressure so as to reduce at least some of said contaminants;
  ii. degassing the resulting oil under reduced pressure and under non-oxidising, e.g. reducing, conditions; and
  iii. extracting the resulting oil with water so as to produce a refined oil.

The following options may be used in conjunction with the first aspect, either individually or in any suitable combination.

The feed oil may contain a haloorganic compound. In this instance the reducing conditions of step i may comprise elemental hydrogen and a hydrogen halide scavenger. The hydrogen halide scavenger may comprise ammonia. It should be noted that in this context, the term "reduce" in step i refers to a chemical reduction and not necessarily to a reduction in the amount or concentration of the contaminants.

The method may additionally comprise step ia between steps i and ii. Step ia comprises separating gaseous hydrogen from the resulting oil at elevated pressure, commonly whilst maintaining the pressure used in step i. The separated gaseous hydrogen may contain condensable hydrocarbons. In this instance, step ia may additionally comprise the steps of: exposing the gaseous hydrogen and hydrocarbons to water so as to reduce the temperature of the gaseous hydrogen; and separating a liquid stream from the gaseous hydrogen, said liquid stream comprising water and hydrocarbons, and commonly also salts. It may additionally comprise separating the hydrocarbons from said liquid stream and combining said hydrocarbons with the oil. The step exposing the gaseous hydrogen and hydrocarbons to water may result in the capture of mists and/or salts.

The method may comprise the step of recycling the separated hydrogen for use in step i.

The method may additionally comprise step ib between steps ia and ii, said step ib being reducing the pressure of the resulting oil from step ia to approximately atmospheric pressure. Step ib may additionally comprise passing the resulting oil through an ambient pressure gas-liquid separator so as to remove a gas therefrom.

Step ii may be conducted at a pressure of less than about 90 kPa absolute, commonly less than about 10 kPa absolute. It may be conducted at a temperature of between about 30 and about 80° C. It may be conducted at elevated temperature. It may be conducted at a temperature of at least about 30° C. It may be conducted for sufficient time that the resulting oil passes required quality tests (e.g. any one or more of IEC 60296 (2012), AS 1767 (1999), ASTM D3487 (2009) and JIC C2320 (1999 and 2000)).

The elevated temperature of step i may be about 200 to about 600° C. The elevated pressure of step i may be about 1 to about 50 MPa.

Step i may be conducted in the presence of a catalyst. In the event that the reducing conditions comprise elemental hydrogen, the catalyst may be a hydrogenation catalyst.

In an embodiment there is provided a method for refining a feed oil, e.g. a used transformer oil, having contaminants therein, said method comprising:
  i exposing said feed oil to reducing conditions at about 200 to about 600° C. and about 1 to about 50 MPa so as to reduce at least some of said contaminants, said reducing conditions comprising elemental hydrogen and a hydrogen halide scavenger such as ammonia;
  ia separating a gaseous stream comprising hydrogen and volatile hydrocarbons from the resulting oil while maintaining the pressure between about 1 and about 50 Mpa; ia' exposing the hydrogen and hydrocarbons to water so as to reduce the temperature of the gaseous hydrogen;
  ia" separating a liquid stream from the gaseous hydrogen, said liquid stream comprising water and hydrocarbons, separating the hydrocarbons from said liquid stream and combining said hydrocarbons with the oil;
  ia''' recycling the separated hydrogen for use in step i;
  ib reducing the pressure of the resulting oil from step ia" to approximately atmospheric pressure and passing the resulting oil through a low, optionally ambient, pressure gas-liquid separator so as to remove a gas therefrom;
  ii degassing the resulting oil under elevated temperature and reduced pressure under non-oxidising conditions, e.g. reducing conditions, such as whilst excluding oxidants from said oil; and
  iii extracting the resulting oil with water so as to produce a refined oil.

In another embodiment there is provided a method for refining a feed oil, e.g. a used transformer oil, having contaminants therein, said method comprising:
  i exposing said feed oil to reducing conditions at about 200 to about 600° C. and about 1 to about 50 MPa so as to reduce at least some of said contaminants, said reducing conditions comprising elemental hydrogen and a hydrogen halide scavenger such as ammonia;
  ii degassing the resulting oil under elevated temperature and reduced pressure under non-oxidising conditions, e.g. reducing conditions, such as whilst excluding oxidants from said oil; and
  iii extracting the resulting oil with water so as to produce a refined oil.

In a second aspect of the invention there is provided a refined oil produced by the method of the first aspect. The refined oil may be of sufficient quality, e.g. sufficiently low volatile content and/or sufficiently low halogen content and/or sufficiently low contaminant content and/or sufficiently low corrosivity, to be used as a transformer oil. It may meet industry standards for transformer oils. It may be of said quality, or meet said standards, without further purification or refining.

In a third aspect of the invention there is provided an apparatus for refining a feed oil, said apparatus comprising a high pressure reactor having a reactor inlet and a reactor outlet; a degassing unit coupled to the reactor outlet; and an extraction unit coupled to the degassing unit for extracting refined oil with water. The apparatus of the third aspect may be for (e.g. may be suitable for or may be specifically designed for) conducting the method of the first aspect and/or for producing the refined oil of the second aspect. The method of the first aspect may be conducted using the apparatus of the third aspect, and the refined oil of the second aspect may be produced using the apparatus of the third aspect.

The following options may be used in conjunction with the third aspect, either individually or in any suitable combination.

The apparatus may additionally comprise a high pressure gas-liquid separator between the reactor outlet and the degassing unit. The separator may have a separator inlet coupled to the reactor outlet, an oil outlet coupled to the degassing unit and a gas outlet. The apparatus may additionally comprise a water inlet disposed so as to combine a hydrogen containing gas exiting the gas outlet with water. It may comprise a hydrogen separator for separating a liquid from the hydrogen containing gas. The hydrogen separator may be coupled to the reactor inlet so as to be capable of recycling hydrogen in the hydrogen containing gas to the high pressure reactor. The hydrogen separator may have a liquid outlet which is coupled to a liquid-liquid separator for separating an aqueous liquid from a non-aqueous liquid, said liquid-liquid separator having an aqueous outlet and a non-aqueous outlet. The non-aqueous outlet may be coupled to the oil outlet of the high pressure gas-liquid separator for combining the non-aqueous liquid with oil exiting the oil outlet. The degassing unit may be a vacuum degassing unit.

It may be a heat-driven degassing unit. It may be a heat-driven vacuum degassing unit.

The degassing unit may be coupled to the reactor outlet by piping and other components which prevent or restrict ingress to the oil of oxidants such as oxygen.

The oil outlet of the high pressure gas-liquid separator may be coupled to a low pressure gas-liquid separator having a low pressure separator outlet, said low pressure separator outlet being coupled to the degassing unit. In this context, "low" pressure refers to pressure below that of the high pressure separator. It may be about ambient pressure. It may be above ambient, e.g. about 1 to about 5 atmospheres or greater than 1 (e.g. about 1.1) to about 5 atmospheres.

The extraction unit may comprise a water inlet disposed so as to combine an oil exiting the degassing unit with water and a water separator for separating water from said oil following its being combined with water.

In an embodiment there is provided an apparatus for refining a feed oil, said apparatus comprising:

a high pressure reactor having a reactor inlet and a reactor outlet;

a high pressure gas-liquid separator having a separator inlet coupled to the reactor outlet, an oil outlet a gas outlet;

a water inlet disposed so as to combine a hydrogen containing gas exiting the gas outlet with water;

a hydrogen separator for separating a liquid from the hydrogen containing gas, said hydrogen separator being coupled to the reactor inlet so as to be capable of recycling hydrogen in the hydrogen containing gas to the high pressure reactor and said hydrogen separator having a liquid outlet which is coupled to a liquid-liquid separator for separating an aqueous liquid from a non-aqueous liquid, said liquid-liquid separator having an aqueous outlet and a non-aqueous outlet, said non-aqueous outlet being coupled to the oil outlet of the high pressure gas-liquid separator for combining the non-aqueous liquid with oil exiting the oil outlet;

a low pressure gas-liquid separator having a low pressure separator outlet, said low pressure outlet being coupled to the oil outlet of the high pressure gas-liquid separator so as to be capable of accepting oil therefrom;

a vacuum degassing unit coupled to the low pressure separator outlet; and an extraction unit coupled to the degassing unit for extracting refined oil with water, said unit comprising a water inlet disposed so as to combine an oil exiting the degassing unit with water and a water separator for separating water from said oil following its being combined with water.

DESCRIPTION OF EMBODIMENTS

Described herein is a high efficiency method for producing new naphthenic base oil of a quality suitable for direct use as new electrical insulating oil or any equivalent application for new naphthenic base of this weight and boiling point range. The present method may be regarded as an improvement of a previous process described by PCT Patent Application PCT/AU93/00682 (published as WO94/14731), the entire contents of which are incorporated herein by reference. The method may be conducted as a batch method or may be conducted as a continuous method or may be conducted as a semicontinuous method.

The present process is an improvement on currently available technology for re-processing used and PCB contaminated transformer oils. It enables the direct production of new naphthenic base oils from used electrical insulating oils. It may do so without further reprocessing to meet industry standards. Suitable industry standards for this purpose include IEC 60296 (2012), AS 1767 (1999), ASTM D3487 (2009) and JIC C2320 (1999 and 2000). Thus the reprocessed oils produced by the present process may meet any or all of these standards. Where reference is made herein to test results (e.g. corrosivity), those results may be as tested in any one of these standards if the relevant standard provides that test. As used herein, the terms "transformer oil", "electrically insulating oil" and "insulating oil" are used interchangeably and should be regarded as equivalent.

In one form the process comprises the steps of: i exposing a feed oil to reducing conditions at elevated temperature and pressure so as to reduce at least some of said contaminants; ii degassing the resulting oil under reduced pressure and optionally elevated temperature under conditions which prevent exposure of the oil to relatively more oxidising conditions, and/or oxidation of the oil and/or of contaminants therein; and iii extracting the resulting oil with water so as to produce a refined oil. Step ii may remove volatile and semi-volatile components before the oil is exposed to any relatively more oxidizing conditions.

The feed oil may any suitable oil which requires refining. The term refining in this context refers to the process of improving the properties of an oil to render it suitable for a desired application. Commonly the oil will have been used in that application previously and that use would have led to the decrease in properties which gave rise to the need for refining. The refining may be for the purpose of returning the oil to a condition in which it meets industry standards for the desired application, or meets regulatory standards, or is in some other way suitable for the desired application. In many instances, previous use of the oil in the application will have led to degradation, i.e. a rise in undesirable contaminants, however in some instances the oil may have been contaminated by exposure to undesirable chemicals, e.g. PCBs. The contaminants may for example be oxidation products, acidic oxidation by-products, low molecular weight products, volatile products, halogenated products, ester oils or some other undesirable contaminant, or may be more than one of these.

The feed oil is commonly a hydrocarbon oil, or predominantly hydrocarbon. It may be aliphatic or may be aromatic or may be a mixture of aliphatic and aromatic materials, optionally aromatic and aromatic hydrocarbons. It may be a naphthenic oil. It may be a mixture of such oils.

Step i of the process involves exposing the feed oil to reducing conditions so as to reduce at least some of the contaminants therein. Commonly these contaminants will comprise halogenated (e.g. chlorinated or brominated) materials. They may comprise halogenated hydrocarbons. They may comprise haloaromatics or haloaliphatics and may be polyhalogenated. They may for example comprise polychlorinated biphenyls (PCBs). Other common contaminants which may be reduced include ester oils, oxidation products, e.g. hydroxy compounds, carbonyl compounds, carboxyl compounds etc. These may have been generated in the oil during previous use. Reduction of these oxidation products may result in generation of a hydrocarbon product with no, or less, oxygen functionality. Reduction of the halogenated materials described above may result in production of a dehalogenated product and (at least in situ) a hydrogen halide.

Common reducing conditions are well known to the skilled worker. A particularly suitable reducing condition for the present application is hydrogen at elevated temperatures. In this context "hydrogen" refers to elemental hydrogen ($H_2$), which will commonly be used in gaseous form. As noted above, reduction of halogenated materials can generate a hydrogen halide. These are corrosive and undesirable, and it is therefore preferable to remove them from the oil. This is preferably achieved by conducting the reduction in the presence of a hydrogen halide scavenger. These scavengers are well known and are basic materials which react with the acidic hydrogen halide. The product of this scavenging reaction may be a solid which may be removed by suitable methods such as filtration, centrifugation etc. or may be removed by extraction (commonly by water, as they are generally water soluble). Common scavengers include amines (e.g. ammonia, mono- di- or tri-organoamines), carbonates, bicarbonates or other basic materials. Ammonia is a preferred scavenger as it is freely available and can be used in liquid or gaseous form, commonly mixed with the hydrogen. The resulting scavenging product is then an ammonium halide. The amount of hydrogen halide scavenger used will depend on the amount of halide in the feed oil. The scavenger may be used in excess on a molar basis (based on halogen atoms), commonly slight excess. It may be used in a molar excess of about 0 to about 100%, or about 0 to 50, 0 to 20, 0 to 10, 0 to 5, 1 to 100, 5 to 100, 10 to 100, 20 to 100, 20 to 50, 1 to 20 or 5 to 20%, e.g. about 0, 1, 2, 3, 4, 5, 10, 15, 20, 25, 30, 35, 40, 45, 50, 60, 70, 80, 90 or 100% or more. The scavenger may be added at a constant rate, based on a predicted maximum concentration of halide in the feed oil. Alternatively, the concentration of halide in the feed oil may be monitored and the addition rate of the scavenger adjusted so as to be sufficient to scavenge any hydrogen halide produced.

In this context it will be recognised that the present process may be conducted batchwise but is more commonly conducted as a continuous process. In the event that it is a continuous process, the ratios of reactants and other materials provided herein should be regarded as ratios of flow rates of those materials. Thus for example, where mention is made of use of a scavenger at, for example, 10% molar excess over the amount of halide, this should be understood to refer, for continuous processing, to a flow rate of scavenger which is 10% higher on a molar basis than the flow rate of the halide.

The reduction reaction may be conducted at a temperature of about 200 to about 600° C., or about 200 to 400, 400 to 600, 300 to 500, 300 to 400, 275 to 375 or 300 to 350° C., e.g. about 200, 250, 275, 300, 325, 350, 375, 400, 450, 500, 550 or 600° C. It may be conducted at a pressure of about 1 to about 50 MPa, or about 1 to 25, 1 to 10, 1 to 5, 2 to 50, 5 to 50, 10 to 50, 20 to 50, 2 to 20, 2 to 10, 2 to 5 or 3 to 5 MPa, e.g. about 1, 2, 3, 4, 5, 6, 7, 8, 9, 10, 15, 20, 25, 30, 35, 40, 45 or 50 MPa.

The reduction reaction of step i is commonly a catalysed reaction. The catalyst may be any suitable catalyst: these are well known to the skilled worker. The catalyst may be a metal catalyst or a mixed metal catalyst, optionally supported. The metal(s) may be a transition metal. The metal may be for example molybdenum, tungsten, chromium, iron, cobalt, nickel, platinum, palladium, iridium, osmium, ruthenium, copper, manganese, silver, rhenium, rhodium, technetium, vanadium, or any suitable combination of two or more of these. These may be in Raney form. They may be in the form of particles embedded in and/or immobilised on a support, e.g. carbon, silica, alumina, titania, aluminium or other suitable support. Suitable catalysts include sulfided Ni/Mo (e.g. 2% Ni/7% Mo) on γ-alumina, platinum on γ-alumina and palladium on γ-alumina. The latter two may be reduced (e.g. hydrogen at 200-800° C.) prior to use.

The reduction reaction is commonly conducted in a reactor. The feed oil and/or one or more of the reagents may be preheated before they are fed to the reactor. They may be preheated to a temperature at or near the desired reaction temperature (described above). The reactor may contain the catalyst (if used). It may be a supported catalyst reactor or a packed bed reactor or a fluidised bed reactor or some other suitable type of reactor.

The outlet oil from the reactor will contain the oil and may additionally comprise one or more of reduction products from the contaminants, residual hydrogen halide scavenger, a scavenged form of the hydrogen halide (e.g. ammonium halide), unreacted hydrogen and gaseous by-products of hydrogenation, This mixture is at elevated temperature and pressure as it exits the reactor and may be passed to a heat exchanger where some of its heat energy is recovered so as to preheat reagents etc. (e.g. feed oil, hydrogen, hydrogen scavenger) prior to their entering the reactor. It may be passed to a high pressure gas-liquid separator. This is primarily to remove gaseous hydrogen and gaseous hydrogenation by-products from the oil stream. It is maintained at high pressure to reduce the need to recompress the recovered hydrogen. The gas stream leaving the high pressure gas-liquid separator will primarily contain hydrogen gas and will generally also contain some hydrogen sulfide and volatile oil components such as high volatility hydrocarbons. This gas stream may then be mixed with water. This serves to cool the stream and condense and/or entrain the components of lower volatility. These may then be separated from the hydrogen stream in a hydrogen separator. The gaseous stream, which is now largely hydrogen, is then passed to a scrubber so as to further purify it and is then recycled into the reactor. The scrubber may remove contaminants such as sulfides and mists. Suitable scrubbers, and methods for scrubbing, are well known in the art. The liquid stream exiting the hydrogen separator contains water together with the recoverable oil components. These are then separated from one another in a liquid-liquid separator and the non-aqueous (commonly predominantly hydrocarbon) stream is rejoined with the oil stream exiting the high pressure liquid-liquid separator. It should be noted that in the present specification, reference to "gas" or "gaseous" includes any substance in a gaseous state and includes vapours (i.e. gases below their critical temperature or below the boiling point of the corresponding liquid at the pressure at the time) and gases above their critical temperature (or above the boiling point of the corresponding liquid at the pressure at the time).

The apparatus of the present invention employs two types of separator: gas-liquid separators and liquid-liquid separators. It will be immediately obvious from the context which of these two types of separators is intended in each specific instance, either because it is explicitly defined or because of the context. Gas-liquid separators are well known in the art. They may for example comprise a chamber in which the liquid enters such that it does not fully occupy the chamber. The chamber will therefore be divided into a liquid space and a gas space. The chamber will have a gas outlet located in the gas space (commonly near the top of the chamber) and a liquid outlet in the liquid space (commonly near the bottom of the chamber). The chamber may be a horizontal, vertical or round vessel. It may comprise internal baffle plates or other high surface area device designed for the liquid to flow in a thin, commonly laminar, film so as to allow gas to escape from the liquid into the gas space. It may comprise nozzles for atomising or spraying the liquid into the chamber. It may be a cyclonic degasser, in which the liquid passes in a thin film around the inner walls of a vessel. It may be a membrane degasser, e.g. a pervaporation device. Liquid-liquid separators are also well known in the art. Suitable liquid-liquid separators include chambers in which the liquid separate under gravity due to their different specific gravities, membrane separators, centrifugal separators etc. They may comprise coalescers. They may comprise high surface area devices e.g. baffles, wire mesh packing etc. It will be recognised that not all of the separators of the same type will be the same and the above options provide independent options for each separator. For example, one gas-liquid separator may comprise baffles whereas another may be a cyclonic degasser.

The oil stream from the reactor, which will commonly have had most of the hydrogen removed in the high pressure gas-liquid separator as described above and may also have had some stripped volatiles also returned to it, also as described above, is then commonly passed to a low pressure gas-liquid separator. In this context, low pressure refers to pressures at or about or somewhat above atmospheric pressure (commonly about 100 to about 500 kPa), but lower than the pressure of the high pressure gas-liquid separator. The low pressure may be greater than about 100 kPa and up to about 500 kPa. It may be for example about 110 to 500, 150 to 500, 200 to 500, 300 to 500, 100 to 300, 100 to 200, 100 to 150, 110 to 300, 110 to 200 or 200 to 400 kPa, e.g. about 100, 110, 120, 130, 140, 150, 200, 250, 300, 350, 400, 450 or 500 kPa. The purpose of this separator is to remove residual oil-soluble high volatility substances from the oil stream which would otherwise compromise product quality. This separator simply vents the oil stream at around ambient pressure so as to allow residual volatiles to flash off. In one alternative, the high pressure gas-liquid separator is not used. In this alternative, the oil from the reactor is passed directly to the low pressure separator. Vented gases would then include substantial amounts of unreacted hydrogen together with volatile oil components. The hydrogen may then be separated from oil components, scrubbed and recycled to the reactor as described above, following recompression and, if necessary, further purification, and the volatile oil components returned to the oil stream also as described above. The return may be before the low pressure gas-liquid separator, or may be into the low pressure gas-liquid separator. It will be appreciated that the oil exits the reactor at high pressure and is later stripped at reduced pressure. The reduction in pressure of the oil may occur in a single step or may be conducted in a number of steps. Thus the pressure may be reduced in a pressure reduction valve following the high pressure gas-liquid separator. Alternatively it may reduce pressure somewhat in the high-pressure gas-liquid separator and then reduce pressure sufficient to pass to the low pressure gas-liquid separator in a separate pressure reduction valve. Other alternatives will be readily apparent to the skilled person.

An important aspect of the present invention is the use of a degassing or stripping step. Thus the oil which comes from the reactor (commonly by way of a high pressure gas-liquid separator and a low pressure gas-liquid separator) is stripped in a degassing unit. The inventor has surprisingly found that this markedly improves the quality of the product refined oil. It is thought that sulfur compounds which are frequently present in the feed oil may at least partially persist through the reduction step or may be converted at least in part to compounds which are difficult to remove, or are incompletely removed, in the high and low (i.e. approximately ambient) pressure gas-liquid separators. Sulfur compounds which may exit the high pressure reactor in the oil, include hydrogen sulfide and other trace sulfides and bisulfides such as ammonium hydrosulfide. This may in part be due to the relatively low volatility of some of these compounds and/or to the elevated miscibility of some of the compounds at elevated pressure and may also in part be due to the relatively high solubility in the oil of related sulfide compounds. The continued presence of such compounds compromises product quality. In order to overcome this, a stripping (degassing) step is introduced into the process. This commonly applies moderately elevated temperatures and reduced pressure to the oil stream so as to remove sparingly volatile or entrained substances although other stripping methods are also contemplated by the invention. In this context, the term "elevated temperature" refers to temperatures above ambient temperature and the term "reduced pressure" refers to pressures below atmospheric pressure, or subambient pressure. The temperature for this step is commonly at least about 30° C., and may be at least about 30, 35, 40, 45, 50, 55, 60, 65, 70, 75, 80, 85, 90, 95 or 100° C., or may be between about 30 and about 100° C., or between about 50 and 100, 30 and 50, 30 and 80, 50 and 80, 60 and 100 or 60 and 90° C., e.g. about 30, 35, 40, 45, 50, 55, 60, 65, 70, 75, 80, 85, 90, 95 or 100° C. The pressure is commonly less than about 90 kPa, or less than about 80, 70, 60, 50, 40, 30, 20, 10, 5, 4, 3, 2 or 1 kPa, or about 0.1 to about 90 kPa, or about 0.1 to 50, 0.1 to 10, 0.1 to 5, 0.1 to 1, 0.1 to 0.5, 1 to 10, 2 to 10, 5 to 10, 1 to 5, 1 to 90, 10 to 90, 50 to 90, 10 to 50 or 2 to 5 kPa, e.g. about 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9, 10, 15, 20, 25, 30, 35, 40, 45, 50, 60, 70, 80 or 90 kPa. These pressures are absolute pressures. Thus a pressure of 10 kPa, for example, will be equivalent to a pressure of around −90 kPaG (i.e. 90 kPa below atmospheric pressure). It will be understood that in order to achieve a particular level of stripping, a higher temperature will generally allow for a less strong vacuum (i.e. higher pressure). The conditions used for this stripping step (which is described as step ii of the process) may be sufficient to remove sufficient volatile materials that the resulting refined oil meets the required standard(s). Further, the higher the pressure and/or the lower the temperature, the longer time will be required in order to achieve the required level of stripping. The skilled person will readily be able to determine suitable conditions for the third variable of temperature, pressure and time if supplied with two of these. The time for stripping (i.e. the residence time of the oil in the degasser) is commonly about 0.5 to about 10 minutes, or about 0.5 to 5, 0.5 to 2, 0.5 to 1, 1 to 10, 2 to 10, 5 to 10, 1 to 5 or 2 to 5 minutes, e.g. about 0.5, 1, 1.5, 2, 2.5, 3, 3.5, 4, 4.5, 5, 6, 7, 8, 9 or 10 minutes, but may be longer or shorter than this.

It is preferred that the stripping/degassing step described above be conducted before the oil is exposed to any relatively more oxidizing conditions than pertain immediately after the reduction step (step i), or before exposure to any oxidants. This step may be conducted under reducing conditions. It may be under non-oxidising conditions. The oil exiting the reactor may be maintained under non-oxidising conditions until after it exits the degassing unit. Oil exiting the reactor retains a certain amount of hydrogen. It may be hydrogen rich and may be hydrogen saturated. It is therefore under relatively reducing conditions. If the oil is subjected to relatively more oxidising conditions before the stripping/degassing step, some reactor product components may react (e.g. oxidise) and thereby may persist in the oil or be rendered more difficult to remove in the stripping/degassing step. This may result in these compounds or compounds derived therefrom persisting in the final product oil. These may cause the oil to fail certain of the standard quality tests described earlier. It is therefore desirable to prevent such reactions. This may be achieved by maintaining chemically non-oxidising conditions in the oil until after the stripping step. It may be facilitated by use of piping and other components between the reactor and the degasser which prevent ingress to the oil of oxidants such as oxygen.

The degassing unit may be for example a vacuum tank degasser. This may comprise a horizontal, vertical or round vessel. A vacuum is created in the vessel. As well as serving to remove volatiles, this can also draw the oil into the tank. When the oil enters the tank, it may be atomised or sprayed into the vessel or may be distributed to a layer of internal baffle plates or other high surface area device designed for the oil to flow in a thin, commonly laminar, film, and is exposed to a vacuum that forces volatile materials to escape from the oil. In a particular embodiment therefore, the degassing or stripping may comprise atomising or spraying the oil into a vacuum chamber by means of one or more nozzles. This may be conducted without the need for internal baffle plates or similar. The vacuum pump passes the escaping volatiles from the vessel and discharges them, preferably after scrubbing to remove toxic products. Alternatively a cyclonic stripping unit may be used, in which the oil passes in a thin film around the inner walls of a vessel whilst a vacuum is applied to the inside of the vessel.

The stripped oil exiting the degassing unit has undesirable volatile components stripped from it. It should be understood that there may be a residual level of volatiles, however these will generally be of a form, concentration and chemistry that is compatible with product quality objectives. They may be present at a level which is acceptable for subsequent use, for example as a transformer oil, and may be present at a level sufficiently low to meet relevant industry and/or regulatory standards. However the oil may still contain substances derived from scavenging hydrogen halide produced in the reactor. These may be solid materials. They may be in the form of a fine dispersion, or in the form of a colloid or in some other form. They are commonly water soluble, as they are commonly salts (e.g. ammonium salts) of the halide. A convenient way to remove them therefore is by extraction with water. This comprises the steps of adding water to the oil stream exiting from the degassing unit and subsequently separating the water from the oil stream so as to remove water soluble components such as salts. It may comprise the step of agitating the oil and water stream so as to improve contact and hence improve extraction. It may also comprise the step of drying the oil stream after separating the water therefrom, so as to remove any residual water that may be present. The water extraction may be conducted using any suitable water extraction device, for example an in-line mixer, a countercurrent extractor etc.

The present invention also encompasses an apparatus for refining oil according to the method of the invention. This apparatus comprises a high pressure reactor having a reactor inlet and a reactor outlet; a degassing unit coupled to the reactor outlet; and an extraction unit coupled to the degassing unit for extracting refined oil with water. These components have been described above.

The product oil refined by the method described above may have the following characteristics:

non-corrosive in accordance with test methods specified in accepted international standards;

when subjected to the 500 hr oxidation stability test as defined in methods described in the current ASTM and IEC international standards for electrical insulating oils (defined earlier herein) it passes the technical performance criteria and has 500 hr acid less than 0.1, commonly 0.05 or less, 0.03 or less or 0.015 or less and, sludge less than 0.02 wt %, commonly 0.01 wt % or less.

Additional components, any one or more of which may be present in the apparatus include:

Feed tanks for one or more of feed oil, hydrogen halide scavenger and hydrogen, these tanks being coupled to a feed line leading to the reactor inlet. It should be noted that, as described above, a preferred option is to recycle unreacted hydrogen from the reactor. Therefore the hydrogen feed tank serves to top up the hydrogen flow to compensate for hydrogen losses both in the reactor (due to reaction in the refining of the oil) and in the recycling.

A recycle compressor for recompressing recycled hydrogen from the hydrogen separator so as to be at a suitable pressure for entry to the reactor.

A water recycle line to feed water from the water extraction device to the gas stream exiting the high pressure gas-liquid separator. Thus the water used for extracting the water soluble materials following the degassing unit may be recycled for use in cooling and condensing partially volatile materials exiting the high pressure gas-liquid extractor in the gas stream. Since this water is ultimately separated from these condensed materials and then commonly sent to waste, the materials extracted from the oil will not accumulate so as to cause problems in the process.

A pressure reduction unit located before the low pressure gas-liquid separator (or before the degassing unit if no low pressure gas-liquid separator is used) so as to reduce the pressure of the oil stream, commonly to approximately atmospheric pressure or slightly above. The pressure exiting the pressure reduction unit may be atmospheric pressure plus or minus about 10%, or plus or minus about 5, 2 or 1%, or may be atmospheric pressure (i.e. 1 bar).

A low pressure gas scrubber for removing noxious gases (e.g. hydrogen sulfide, volatile thiols etc.) from a gas stream exiting the low pressure gas-liquid separator and optionally also from the degassing unit. Following scrubbing these gases may be vented to the atmosphere.

In a specific embodiment of the invention, therefore, feed oil (used and/or contaminated electrical insulating oil) is pumped into a recirculating compressed hydrogen stream along with ammonia. The combined oil, ammonia and hydrogen stream is then heated to reaction temperature in a heat exchanger before being passed through a hydroprocessing reactor containing hydrogenation catalyst. After hydrogenation, reactor gases are flashed off for recycle. The recycle gases are quench cooled and then passed through a caustic scrubber before recompression to form the hydrogen recycle stream. Fresh hydrogen is added to the recycle stream to maintain the desired hydrogen mass flow and partial pressure in the reactor. The reactor oil product is cooled, depressurised and passed through a gas liquid separator. The gas product is passed through low pressure caustic scrubber before venting. The oil product is then processed using heat and vacuum to remove reduced volatile and semi-volatile oil soluble sulphur compounds and any volatile oil oxidation initiators which may be present.

The feedstock for the present process may be an electrical insulating oil, used or contaminated electrical insulating oil, PCB contaminated electrical insulating oil, corrosive or corrosive sulphur-containing electrical insulating oil or any other type of oil which is unsuitable for use as a transformer oil but is capable of being made so suitable.

The product of the present process may be a naphthenic base oil suitable for direct use as new or unused electrical insulating oil or any other naphthenic base oil product typically containing the weight fraction and boiling point range of naphthenic base oil. They may for example be suitable for use as cutting oils, agricultural oils, high solvency base oils etc.

The present process is designed to improve quality and consistency of product oil in line with market demands and developments, while simplifying the overall production process of new naphthenic oils from used naphthenic oils. Through this invention, the improved process removes, or at least reduces, the need for further post-refining treatment currently necessary. The new process consequently improves the energy efficiency and the emissions embodied in the final product. The process is an improved process for the conversion of used and contaminated electrical insulating oil, referred to herein as refining, to new naphthenic base oil directly suitable for use as new electrical insulating oil and equivalent naphthenic base oil applications.

Figure 1:
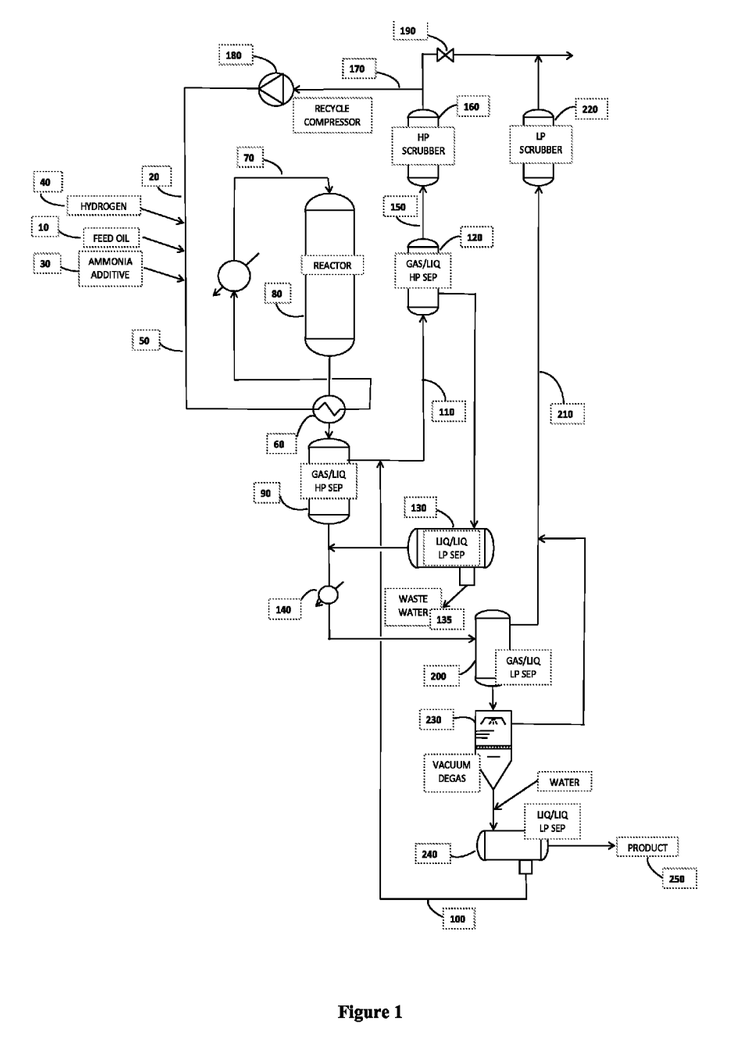
FIG. 1 is a scheme illustrating a specific embodiment of the present invention.

A specific example of the process is described below with reference to FIG. 1

The feed stream 10 is pumped into a recirculating hydrogen stream 20 at reaction pressure. Ammonia additive 30 is also pumped into the recirculating hydrogen stream 20. Make up hydrogen 40 is also added to the recirculating hydrogen stream in order to ensure the correct hydrogen/ammonia/feed oil ratio. Commonly the ratio of hydrogen to feed oil is approximately 400 nm$^3$ of H$_2$/m$^3$ of oil. The combined hydrogen, feed and ammonia additive stream 50 is passed through a cross exchanger (i.e. a heat exchanger designed to transfer heat energy between different fluids in the process) 60 and then a heat exchanger (not numbered) to raise it to reaction temperature before it is passed through feed line 70 to a fixed bed catalytic reactor 80. A controlled rate of heat transfer in heat exchanger (not numbered) plus an adequate hydrogen partial pressure is important in preventing polymerisation of the feed oil and coking in the exchanger and reactor. The reactor products exiting reactor 80 contain a mix of hydrogen, hydrogenated oil, other reactor gases, water and salts. The stream exiting the reactor 80 also contains reactive dissolved volatile and semi-volatile reduced sulphur compounds and volatile or semi-volatile oxidisable oil compounds formed during hydrogenation of the feed. This stream is passed through cross exchanger 60 so as to transfer heat energy to feed stream 50 so as to recover heat and cool the reactor outlet stream before further processing. Reactor gases, primarily recycle hydrogen, are flashed off the reactor products in a gas liquid separator 90. The gases are water quenched using water from the final product water wash 100. Water quenching this stream recovers further hydrocarbon and cools the stream enabling better separation of entrained liquids. The quenched stream 110 is passed through a high pressure gas liquid separator 120 to separate the recycle hydrocarbon from condensable liquids. The liquid stream from the separator is passed to a low pressure liquid/liquid separator 130 where the oil can be recovered and combined with the main reactor product oil flow while the water removed from the process at this point as waste water 135. The recovered excess hydrogen stream 150 is run through a high pressure scrubber 160 to remove hydrogen sulfide created in the reactor to form a reusable hydrogen stream 170 that is recompressed in recycle compressor 180 to produce the recirculating hydrogen stream 20. To maintain hydrogen purity, a proportion of this stream can be vented from the process unit via a purge valve 190. Make up hydrogen 40 is added as required to the recirculating hydrogen stream 20 to maintain hydrogen partial pressure and purity necessary for the primary hydrogenation reactions. The combined hydrogenated oil product from separators 90 and 130 is depressurised using a pressure reducer valve (not shown) and then cooled in heat exchanger 140 before being passed to a low pressure gas liquid separator 200 to remove residual dissolved gases. Recovered residual gases are vented from the process through line 210, following scrubbing by low pressure scrubber 220 to remove toxic gases such as thiols, hydrogen sulfide etc. The cooled, depressurised oil from separator 200 is then subject to vacuum degassing at 4 kPa absolute pressure and 60° C. in vacuum degassing unit 230 to force removal of reactive reduced dissolved volatile and semi-volatile organic sulphide compounds and volatile semi polar oil compounds, under reducing atmosphere, to produce an oil stream containing dissolved non-volatile salts. The degassed oil is then water washed to remove dissolved salts before passing through liquid/liquid separator 240 to produce the final naphthenic base oil products 250. The gases from vacuum degassing unit 230 are passed through the low pressure scrubber 220 before venting from the operation. Water from separator 240 is recycled for use in quenching gases from separator 90.

EXAMPLE

Using a purpose designed continuous process bench scale research reactor, used and contaminated transformer oil was introduced to a hydrogen stream after which an ammonia solution of 2.5% by weight at a ratio of 1% of the feed oil flow was pumped into the stream. The stream was processed through a hydrogenation reactor at a constant space velocity of 1.5 hr$^{-1}$ using a standard alumina supported Ni—Mo hydrogenation catalyst under conditions of temperature and pressure defined in the table below. During the run, temperature and pressure was varied while samples at the various run conditions were taken. After the reactor, the products were cooled and the oil samples collected in a gassy and wet state. The samples were then vacuum dried and degassed in a warmed laboratory scale batch vacuum degassing rig. After warm degassing the samples were washed with deionised water and separated from the wash water. Once washed, the samples were again dried to produce a final naphthenic base oil product. Standard antioxidant additives were combined with the sample to produce an inhibited electrical oil product consistent with international technical standards.

Collection of sample from the bench reactor while excluding exposure to oxidizing conditions is difficult. In parallel with the bench scale trials, a side stream was drawn off a full scale production line, running the same feedstock oil under comparable conditions, and run to a vacuum degassing unit after which the degassed sample was drawn off the main plant then laboratory dried and inhibited without any further processing.

TABLE

Summary of experimental results

| RUN NUMBER | TEMP (deg C.) | PRESSURE (MPa) | 500 hr ACID (mgKOH/g) | 500 hr SLUDGE (weight %) | OXIDATION STABILITY | SATURATES | CORROSIVITY |
|---|---|---|---|---|---|---|---|
| 1 | 305 | 3.5 | 0.014 | 0.011 | Pass | 84.1 | N.A.* |
| 2 | 330 | 3.6 | 0.015 | 0.009 | Pass | 83.6 | N.A.* |
| 3 | 360 | 3.5 | 0.018 | 0.011 | Pass | 80.0 | N.A.* |
| 4 | 305 | 4.1 | 0.010 | 0.015 | Pass | 84.4 | N.A.* |
| 5 | 330 | 4.1 | 0.014 | 0.010 | Pass | 84.5 | N.A.* |
| 6 | 360 | 4.1 | 0.026 | 0.008 | Pass | 79.2 | N.A.* |
| 7 (sidestream) | 305 | 3.5 | 0.031 | 0.009 | Pass | 84.7 | Non Corrosive, 3a |
| Feedstock | N.A. | N.A. | N.A. | N.A. | N.A. | 85.0 | N.A. |
| Normal Production | 305 | 3.5 | 2.41 | Not measured | Fail | not measured | Corrosive |

Figure 2:
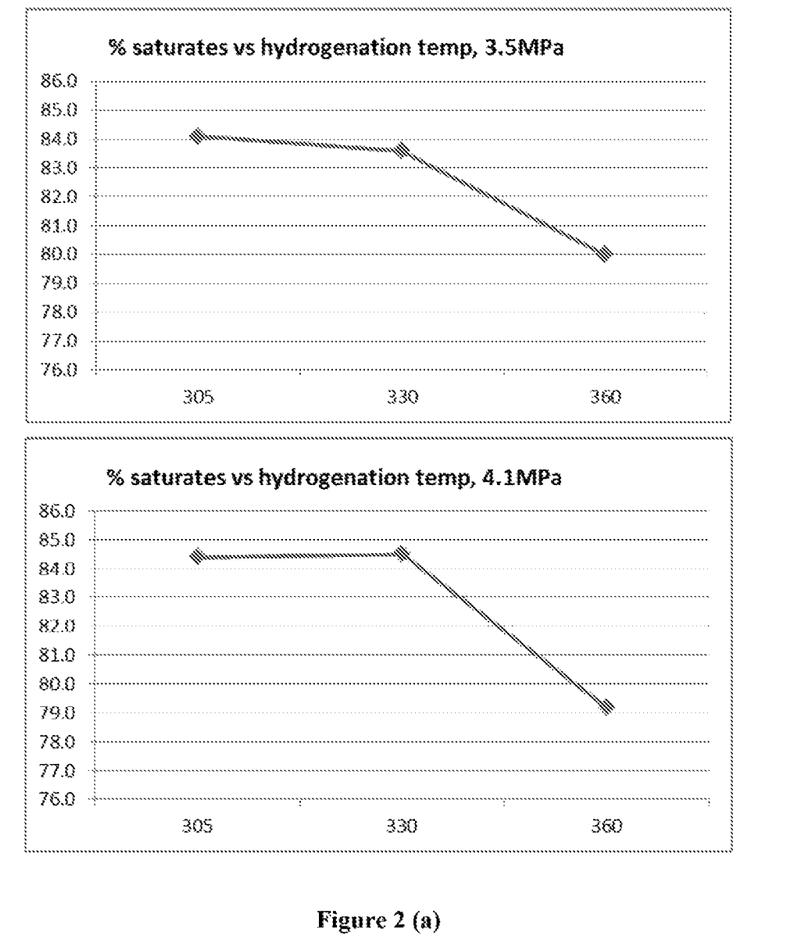
FIGS. 2(a), 2(b) and 2(c) show results from experimental runs illustrating the effects of certain variables.

LHSV for all (other than feedstock) was 1.5 hr$^{-1}$
Hydrogen to oil ratio for all (other than feedstock) 400 Nm$^3$/m$^3$
Catalyst for all was NiMo on alumina
N.A.: not available FIGS. 2(a) to 2(c) show the effects of various parameters on the results. It can be seen that the variations in temperature, pressure etc. have a relatively small effect on the quality (sludge, acid, saturates and oxidation stability) of the resulting refined oil. Additionally, run 7, which was a plant production run, shows that similar results may be obtained in full scale production. However the final row of the table, labelled Normal Production, represents the former process without the degassing step (i.e. without step ii as defined in the present process) and generates unsatisfactory product oil, with high acid values and poor oxidation stability. Additionally, when comparing run 7 with Normal Production it can be seen that the improved process of run 7 provides a non-corrosive product in contrast to the corrosive product of the Normal Production.

Operating experience over a period of 7 years demonstrates that the previous process (as described in WO94/14731) did not directly produce oil to the necessary quality standard without additional post-refining processing. The above experiments show that the disclosed process and procedures produce naphthenic base oil from used and contaminated transformer oil feedstock with properties making it suitable for direct use in the production of new electrical insulating oil. In particular the oil produced by the present process has low corrosivity and excellent oxidation stability relative to comparable electrical insulating oil produced from crude derived naphthenic base oil.

The results show that oxidative stability and corrosivity, as measured by IEC and ASTM standard test methods, do not vary materially with reactor conditions or degree of saturation of product but do vary materially with operating conditions and process sequencing downstream of the reactor, to exclude oxidizing conditions until after oil degassing.

Thus the presently described process represents an improvement in the previous process for refining oils. The base oil and electrical insulating oil produced by the previous process contain corrosive compounds and oxidation initiators. Without additional post refining treatment, the product of the existing process does not consistently meet industry standards for oxidative stability or corrosivity. The compounds creating these instabilities in product performance are formed through the exposure of the reactor product to oxidising conditions that occur as part of the original process. The present improvements have been developed through observational and laboratory scale research combined with testing of the full process over a two year period to identify the point in the process at which corrosive behaviour in the product arises, the type of trace impurity that influences oxidative stability of the product, and the response of the product to oxidation inhibitors. The process improvement jointly removes the crucial formation step for corrosive species and precursors to oxidation initiation in the oil.

The invention claimed is:

1. A method for refining a feed oil having contaminants therein, said method comprising:
    i. exposing said feed oil to reducing conditions at elevated temperature and pressure so as to reduce at least some of said contaminants;
    ii. degassing the resulting oil at below atmospheric pressure under reduced pressure under non-oxidising conditions; and
    iii. extracting the resulting oil with water so as to produce a refined oil.

2. The method of claim 1 wherein the feed oil contains a haloorganic compound and said reducing conditions of step i comprise elemental hydrogen and a hydrogen halide scavenger.

3. The method of claim 2 wherein the hydrogen halide scavenger comprises ammonia.

4. The method of claim 1 additionally comprising step ia between steps i and ii, step ia being separating gaseous hydrogen from the resulting oil whilst maintaining the pressure used in step i.

5. The method of claim 4 wherein said separated gaseous hydrogen contains hydrocarbons and step is additionally comprises the steps of:
    exposing the gaseous hydrogen and hydrocarbons to water so as to reduce the temperature of the gaseous hydrogen; and
    separating a liquid stream from the gaseous hydrogen, said liquid stream comprising the water and the hydrocarbons.

6. The method of claim 5 comprising separating the hydrocarbons from said liquid stream and combining said hydrocarbons with the oil.

7. The method of claim 4 comprising the step of recycling the separated hydrogen for use in step i.

8. The method of claim 4 additionally comprising step ib between steps ia and ii, said step ib being reducing the pressure of the resulting oil to approximately atmospheric pressure.

9. The method of claim 8 wherein step ib additionally comprises passing the resulting oil through an ambient pressure gas-liquid separator so as to remove a dissolved gas therefrom.

10. The method of claim 1 wherein the elevated temperature of step i is about 200 to about 600° C.

11. The method of claim 1 wherein the elevated pressure of step i is about 1 to about 50 MPa.

12. The method claim 1 wherein step i is conducted in the presence of a catalyst.

13. The method of claim 1, wherein step ii is conducted before the oil is exposed to any relatively more oxidizing conditions than pertain immediately after step i.

14. The method of claim 1, wherein step ii is conducted before exposure of the oil to any oxidants.

\* \* \* \* \*